United States Patent

Benson et al.

Patent Number: 5,819,252
Date of Patent: Oct. 6, 1998

[54] METHOD AND APPARATUS FOR HANDLING AND DETECTING AN INVALID USE OF A DATA STRUCTURE

[75] Inventors: Thomas R. Benson; Michael S. Harvey, both of Hollis; Karen L. Noel, Pembroke; Mark E. Arsenault, Mason; Leonard S. Szubowicz, Merrimack; Gary M. Barton, Nashua; Ronald F. Brender; Kenneth W. Cowan, both of Hollis, all of N.H.; Mark W. Davis, Belmont; Richard E. Peterson, Groton, both of Mass.; Cheryl D. Stocks, Londonderry, N.H.

[73] Assignee: Digital Equipment Corporation, Maynard, Mass.

[21] Appl. No.: 630,795

[22] Filed: Apr. 10, 1996

[51] Int. Cl.[6] .................................................. G06F 17/30
[52] U.S. Cl. .................. 707/1; 707/2; 707/6; 395/183.14
[58] Field of Search .................. 395/183.14, 671, 395/705, 700, 708, 709, 500; 711/2, 202

[56] References Cited

U.S. PATENT DOCUMENTS

| | | | |
|---|---|---|---|
| 4,388,685 | 6/1983 | Kotok et al. | 711/2 |
| 5,313,616 | 5/1994 | Cline et al. | 395/500 |
| 5,493,675 | 2/1996 | Faiman, Jr. | 395/709 |
| 5,577,253 | 11/1996 | Blickstein | 395/705 |
| 5,613,117 | 3/1997 | Davidson | 395/708 |
| 5,630,087 | 5/1997 | Talluri | 711/202 |
| 5,659,753 | 8/1997 | Murphy | 395/705 |
| 5,664,193 | 9/1997 | Tirumalai | 395/705 |
| 5,689,677 | 11/1997 | MacMillian | 365/222 |
| 5,689,713 | 11/1997 | Normoyle | 395/736 |
| 5,694,604 | 12/1997 | White | 395/671 |

*Primary Examiner*—Wayne Amsbury
*Assistant Examiner*—Diane D. Mizrahi
*Attorney, Agent, or Firm*—Anne E. Saturnelli

[57] ABSTRACT

A method executed in a computer system for detecting and handling an invalid use of a data structure is described. The method includes the steps of providing a data structure associated with a first computing environment. The data structure includes a field having a value stored therein identifying an inaccessible address in a second computing environment. This field is used in detecting an invalid use of the data structure in the second computing environment by a computer program attempting to access memory using said inaccessible address indicated by said value contained in the first field. Additionally a preferred data structure is described as are alternative embodiments of detecting an invalid use of a data structure.

30 Claims, 6 Drawing Sheets

METHOD AND APPARATUS FOR HANDLING AND DETECTING AN INVALID USE OF A DATA STRUCTURE

BACKGROUND OF THE INVENTION

This invention relates generally to computer systems and more particularly to computer programs executing in a computer system.

As it is known in the art, computer systems generally include a central processing unit (CPU), a main memory and an input/output device interconnected by a bus. Computer systems are used to execute computer programs which perform a useful task. Usually, a computer program and its associated machine executable are made for execution in a particular computing environment. A computer program typically includes, for example, a source program which is compiled to produce a machine executable for execution in a particular computer system. A computing environment typically comprises a computer architecture as well as an operating system, and a particular calling standard.

Generally, an operating system includes software resources needed by the computing system to interface hardware elements to the computer system as well as interface a computer program to other computer programs in the computer system. A calling standard typically defines requirements, mechanisms and conventions used by an application program or computer program. In particular, the calling standard can define runtime or execution time data structures, constants, algorithms, methods, and a functional interface for use by a computer program enabling the computer program to operate correctly at runtime in the particular computing environment.

A change in one of the elements comprising the computing environment in which a computer program executes generally necessitates a change to one of the components comprising the computer program. There may be a change in the computer architecture, and thus, the instruction set. For example, if a new computer architecture is developed which provides significant performance improvements to the hardware associated with the computer architecture, a computer program machine executable cannot run directly on the new architecture due to the different instruction sets of the new and prior architectures. As a result, source code used to produce the computer program machine executable is typically recompiled to produce another machine executable program comprising instructions for execution on the new architecture.

Another change to the computing environment includes a change in the calling standard in the computing environment. If the change is made to the underlying addressing scheme used in the computing environment, the calling standard needs to be modified to include the new addressing scheme. For example, one version of a calling standard may use a 32-bit virtual address to represent a memory address in a computing environment. The addressing scheme of virtual memory may be expanded to include a 64-bit virtual address corresponding to a memory location. Such an expansion in the virtual address from 32-bits to 64-bits typically precipitates a change in the calling standard associated with the computing environment. Generally, the calling standard, and hence any data structures included in that calling standard, are modified to include 64-bit addresses rather than 32-bit addresses. The effect is that the underlying data structures used in the calling standard are modified when a virtual memory address is expanded from 32-bits to 64-bits. Thus, computer programs which adhere to the calling standard are also typically affected by such a change.

When the change to the computing environment includes a change to the calling standard, as described above with an expanded virtual addressing scheme, a problem arises when a first computer program operating in accordance with the original calling standard interacts with another computer program operating in accordance with a new calling standard. A problem arises in that the first computer program and second computer program may interact with one another, for example, as by a procedure call between the first and second computer programs.

At runtime, failure to properly detect and handle such differences in calling standards can cause several problems. One problem is loss of data integrity which can occur if an existing routine receives a data structure having 64-bit virtual addresses when expecting a data structure having 32-bit virtual addresses and the existing routine does not detect this invalid runtime use.

Failure to properly detect and handle an invalid or incompatible use of a data structure can unduly complicate debugging a computer program. For example, a routine receives a data structure comprising 64-bit virtual addresses when expecting a data structure comprising 32-bit virtual addresses. At runtime, the routine proceeds to interpret virtual addresses and other fields in the data structure incorrectly and performs a data modification to a data structure in memory or a data file causing a runtime error to occur much later in program execution when a different routine attempts to access the modified data in memory or in the data file. At this point, a developer debugging the computer program would not know which routine actually caused the invalid data or loss of data integrity problem.

SUMMARY OF THE INVENTION

In accordance with the present invention a method executed in a computer system for handling an invalid use of a data structure includes providing a data structure associated with a first computing environment having a field with a value stored therein identifying an inaccessible address in a second computing environment is provided. An invalid use of the data structure in the second computing environment is detected when a computer program attempts a memory access using the inaccessible address. With such an arrangement, a data structure written for use in the first computing environment can be defined to enable predictable behavior when the data structure is invalidly used in the second computing environment. An invalid use of a data structure can be determined in an efficient manner without adversely impacting code, i.e., generally without any modification to existing source code. The technique for invalid detection affords the advantage of detecting an invalid use reducing the risk of data integrity and debugging problems. Additionally, new code can be designed to examine the data structure and determine reliably whether it contains data written for use in the first or second computing environments.

BRIEF DESCRIPTION OF THE DRAWINGS

The above-mentioned and other features of the invention will become more apparent by reference to the following description taken in connection with the accompanying drawings, in which.

DETAILED DESCRIPTION OF PREFERRED EMBODIMENTS

Figure 1:
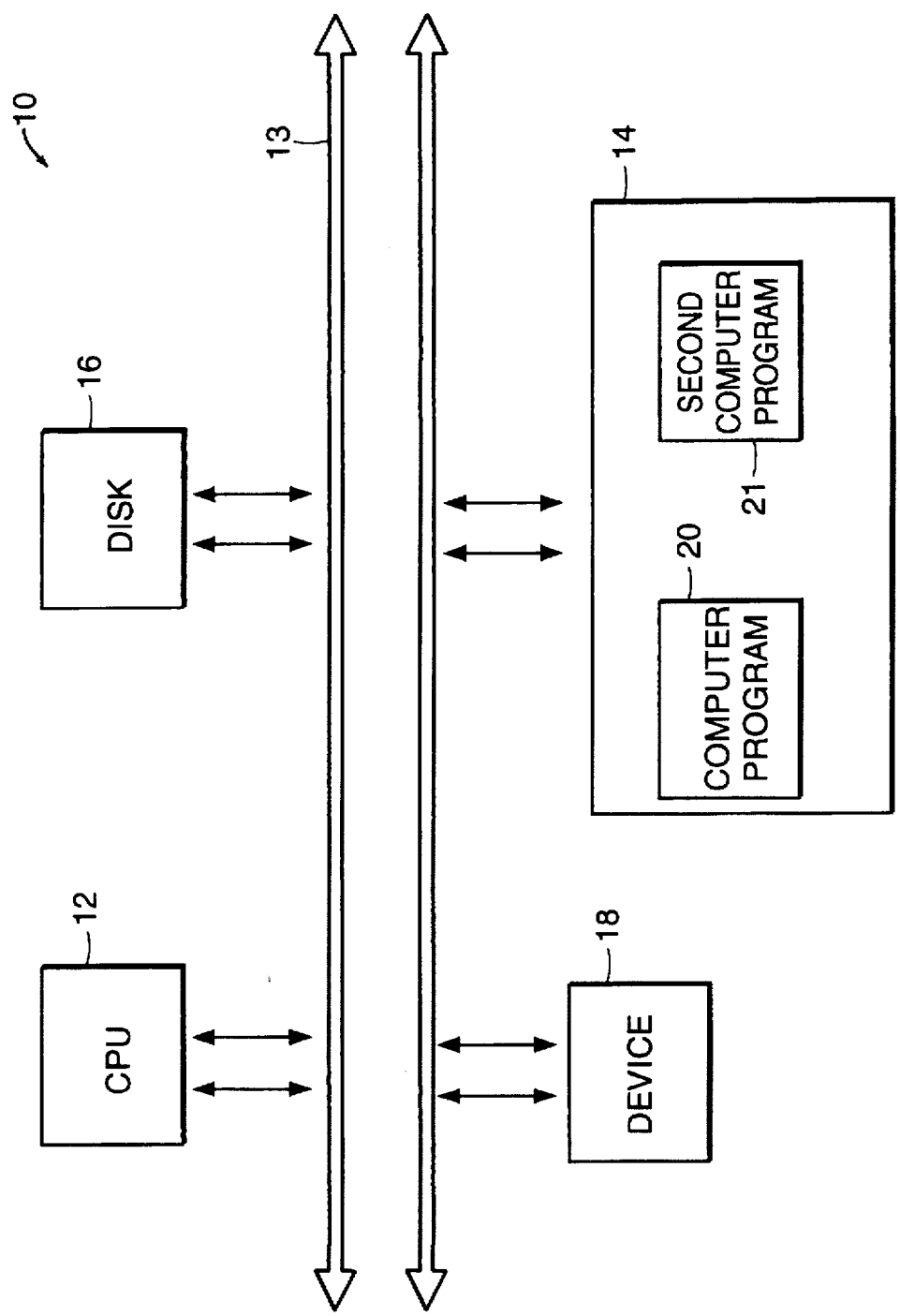
FIG. 1 is a simplified block diagram of a computer system.

Referring now to FIG. 1, a computer system 10 is shown to include a CPU 12 which is interconnected via a system bus 13 to a main memory 14, a disk storage device 16, and another system device 18, such as a user I/O device that includes a terminal and keyboard. The CPU 12, disk drive 16, main memory 14, and device 18 communicate over the system bus 13.

A computer program 20 that includes machine executable instructions is resident in main memory. The computer program 20 is written to execute in a first computing environment. The first computing environment includes a first calling standard, an operating system and a computer architecture. Here the first computer program 20 is written in accordance with a first calling standard using a 64-bit virtual addressing scheme. The first computer program is intended to operate in the first computing environment wherein each virtual memory address is 64-bits.

The above can represent a situation where the addressing scheme of the first computing environment results from an expansion of a second, typically prior computing environment of an existing 32-bit operating system including 32-bit virtual addresses enhanced to the new 64-bit operating system including 64-bit virtual addresses for use with the new 64-bit computer architecture of the computer system 10. That is, the virtual memory address increases from 32-bits to 64-bits in length. To accommodate this expanded addressing scheme, the first calling standard is specified.

A second computer program 21 written in accordance with the second calling standard in which virtual memory addresses are 32-bits in length rather than 64-bits in length is also shown resident in main memory 14.

Modifications to the second calling standard when the addressing scheme is expanded from 32-bits to 64-bits as in the first calling standard typically includes a modification to the data structures included in the second calling standard, such as data structures used for passing arguments and routines.

The first computing environment, such as one with a 64-bit virtual addressing scheme, has the first calling standard and includes a first data structure as will be described in conjunction with FIG. 2A. The second computing environment, i.e. the 32-bit virtual addressing scheme, has the second calling standard that includes a second data structure, as shown in FIG. 2B.

Figure 2A:
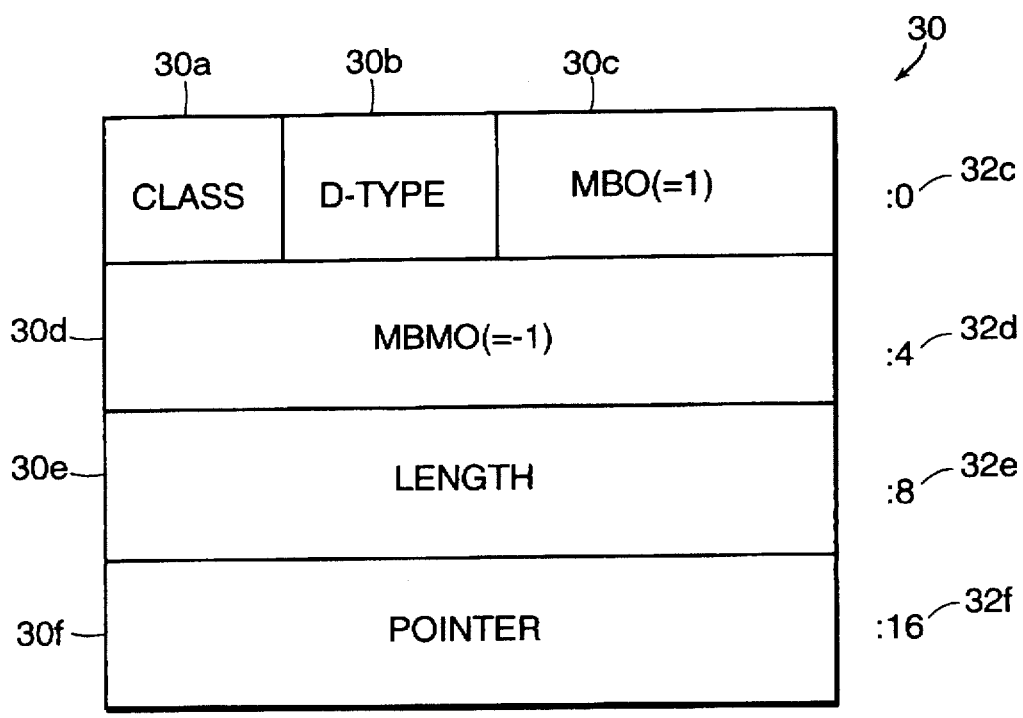
FIG. 2A is a block diagram of a data structure used in a first computing environment which includes a 64-bit virtual addressing scheme.

Referring now to FIG. 2A, a format for an argument descriptor used for interpreting a data structure in the first 64-bit calling standard is shown. This argument descriptor 30 can be used within an operating system, such as the OpenVMS® Operating System, that expands from a 32-bit to a 64-bit virtual addressing scheme. The argument descriptor is included in the first calling standard in which the virtual memory addresses have been expanded to 64-bits.

Argument descriptor 30 has CLASS field 30a and D-TYPE field 30b. The argument descriptor also includes a dummy length field, here specified as the MBO (Must Be One) field 30c, and an invalid address field, here specified as the MBMO (Must Be Minus One) field 30d. The argument descriptor 30 also has a LENGTH field 30e that represents the length of the data structure being described by the argument descriptor 30.

Figure 2B:
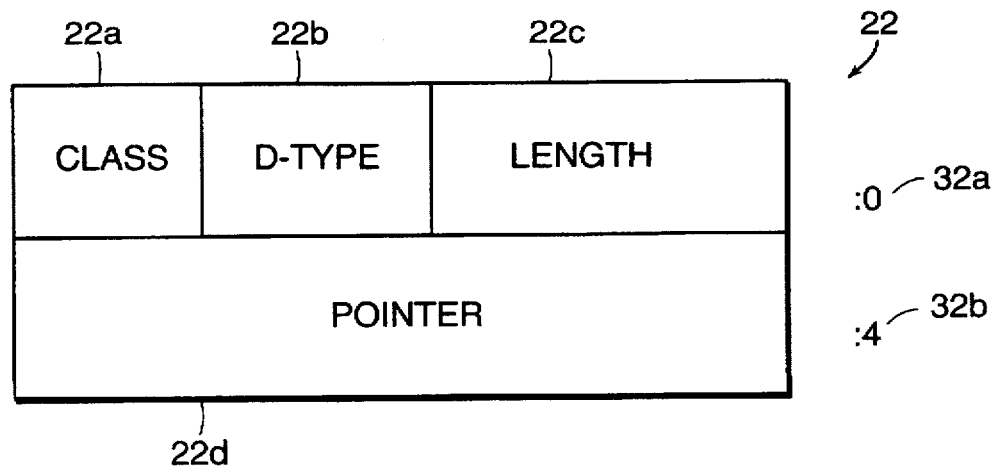
FIG. 2B is a block diagram of a conventional data structure used in a second computing environment with a 32-bit virtual addressing scheme.

Referring also now to FIG. 2B, a format for an argument descriptor 22 used for interpreting data structures in the second 32-bit calling standard is shown. This argument descriptor 22 is generally used in data structures in the 32-bit version of the OpenVMS® Operating System by Digital Equipment Corporations. Here, address fields or pointers are 32-bits in length. The argument descriptor 22 is a mechanism used within the second calling standard to describe arguments which are data structures passed to and from a routine. The argument descriptor 22 includes a CLASS field 22a, a D-TYPE or data type field 22b, a LENGTH field 22c and a POINTER or address field 22d. The CLASS field 22a contains an integer quantity that represents the class of the argument being passed. A class of an argument descriptor represented by a numeric quantity includes, for example, a fixed length dynamic string, an array, a varying length string or a bit string. Generally the CLASS field identifies a general class of the data for the associated argument. The class code may affect the format and interpretation of other subsequent fields of data in the data structure not shown in FIG. 2B. For example, if the CLASS type is an array, data contained in subsequent fields following POINTER field 22d may be interpreted as an upper bound and a lower bound for an array dimension. An example of these subsequent fields will be described in conjunction with FIG. 5B. The format of the argument descriptor 22 functions as a uniform prototype for multiple argument descriptor formats that may be included in the second calling standard. For example, the uniform prototype 22 is included as a header in each argument descriptor format followed by other fields of information particular to each argument descriptor.

The value contained in the D-TYPE field 22b is an integer quantity representing an argument data type. Data types typically include, for example, integer, floating-point, unaligned bit string, aligned bit string and character string. Taken together, the CLASS and D-TYPE fields describe the data or information comprising the data structure of the argument. The LENGTH field 22c contains an integer quantity that represents the length or size of an associated data item, for example, which is the argument being passed in a routine call. Using this field, an application or computer program may figure out the ending address of the data item. The POINTER field 22d contains the address of the first byte of data storage corresponding to the argument.

Shown on the right hand side of FIG. 2B are byte offsets 32a and 32b. The byte offsets indicate a displacement from the beginning of the data structure at which the rightmost field in the figure begins. Fields in the data structure are read sequentially from right to left and top to bottom corresponding to a layout of the data structure in memory. For example, the LENGTH field 22c is stored at byte offset 0. The D-TYPE field 22b is stored at offset 2. The CLASS field 22a begins at offset 3 and finally the POINTER field 22d begins at offset 4. Any field following the POINTER field would begin at offset 8. Note that the POINTER field 22d is 32-bits in length corresponding to the size of a virtual memory address in the OpenVMS® Operating System.

As mentioned above, the data structure in FIG. 2B corresponds to an argument descriptor used in the second calling standard in which a 32-bit addressing scheme is used in the computer system. FIG. 2A corresponds to the argument descriptor of FIG. 2B modified to provide the first calling standard in which the virtual memory addressing scheme in the computer system has been expanded to 64-bits. Certain fields, here fields 30c and 30d in the first data structure 30 are substitutes for, respectively, the fields 22c and 22d of the second data structure in FIG. 2B. Thus, the MBO field (must be 1) 30c corresponds to the bit positions of the LENGTH field 22c in the second data structure. Field MBMO (must be minus 1) 30d corresponds to the bit positions of the POINTER field 22d in the second data structure 22. Functionally, the MBMO field contains a 32-bit memory address which is invalid in the second computing environment using the 32-bit calling standard. The MBMO field contains a value guaranteed to produce a negative or invalid address when added to the value of the MBO field and, subsequently, subtracting 1 from the result. The result produced by adding the values in the MBMO and the MBO fields and subsequently subtracting the integer 1 produces an invalid address in the second computing environment.

The precise values of the MBMO and the MBO fields vary with computing environment since an invalid address in one computing environment may not be an invalid address in another computing environment. One embodiment of the data structure as used in the OpenVMS® Operating System with 64-bit virtual addressing has the MBO field containing the integer 1 and the MBMO field containing the integer −1.

POINTER field 30f of data structure 30 contains the address of the first byte of data storage corresponding to the argument in the first computing environment. Accordingly, POINTER 30f is similar to POINTER 22d in that both contain a memory address referring to the first byte of data storage of the argument except that POINTER 30f is in a different bit location and is only valid in the first computing environment. In addition to the offset displacement from the beginning of the data structure, fields 22d and 30f differ in size. POINTER field 30f is 64-bits in length which is the size of the virtual memory address in the first calling standard, whereas POINTER 22d is 32-bits in length corresponding to the size of a virtual memory address in the second calling standard.

Similarly, as in FIG. 2B, byte offsets 32c–32f of FIG. 2A indicate the byte offset from the beginning of the argument descriptor 30 at which the rightmost field begins, and the memory layout of information contained in the data structure is from right to left, and top to bottom.

The first computer program 20 is written in conformance with the first calling standard and passes arguments using a scheme that conforms to a 64-bit addressing arrangement. Computer program 21 is comprised of executable code which conforms to the second calling standard and thus passes arguments using descriptors with 32-bit addresses, as in FIG. 2B. The first and second programs may interact at runtime, as by a routine call from a routine in the first computer program 20 to the second program 21. In this situation, the argument descriptor 30 is designed to have code which expects an argument descriptor 30 of the format type of FIG. 2B to fail predictably or behave in a predictable fashion, without modification, when the argument descriptor of the format of FIG. 2A is passed in a routine call. For example, the second program 21 can be a library routine written in accordance with the second calling standard and may be called by code, such as the first program 20 written in accordance with the first calling standard.

As such, the library routine expects argument descriptors of the format shown in FIG. 2B. The code corresponding to the first calling standard can send and initialize a data structure for an argument descriptor of the data format in FIG. 2A. It would be desirable to have the library routine without modification behave in a predictable fashion when passed an argument descriptor shown in FIG. 2A. It is this predictable behavior which the design and layout of the data structure in FIG. 2A achieves.

An argument descriptor can also be used to interpret data in contexts other than routine calls and parameters, as described above. For example, different argument descriptors can be used to interpret the same data item in two different ways without being passed as routine parameters. Additionally, an argument descriptor can be used to interpret common or globally available data, such as that contained within a FORTRAN common block, which is not necessarily passed as a routine parameter.

The argument descriptors 22 and 30 each include a D-TYPE and CLASS field describing a corresponding data item, such as a routine parameter. The precise format and fields comprising the argument descriptors vary with implementation and computing environments. For example, another embodiment of the argument descriptors 22 and 30 can have a single type field rather than include both the D-TYPE and CLASS fields depending on the quantity and specific types of data that the argument descriptors are used to interpret.

The precise location of data fields within the argument descriptors can also vary with implementation provided that the format of the argument descriptor of the first calling standard include fields, such as MBO 30c and MBMO 30d, whose bit positions substitute or overlay LENGTH field 22c and POINTER field 22d, respectively, as defined in the second calling standard.

Figure 3:
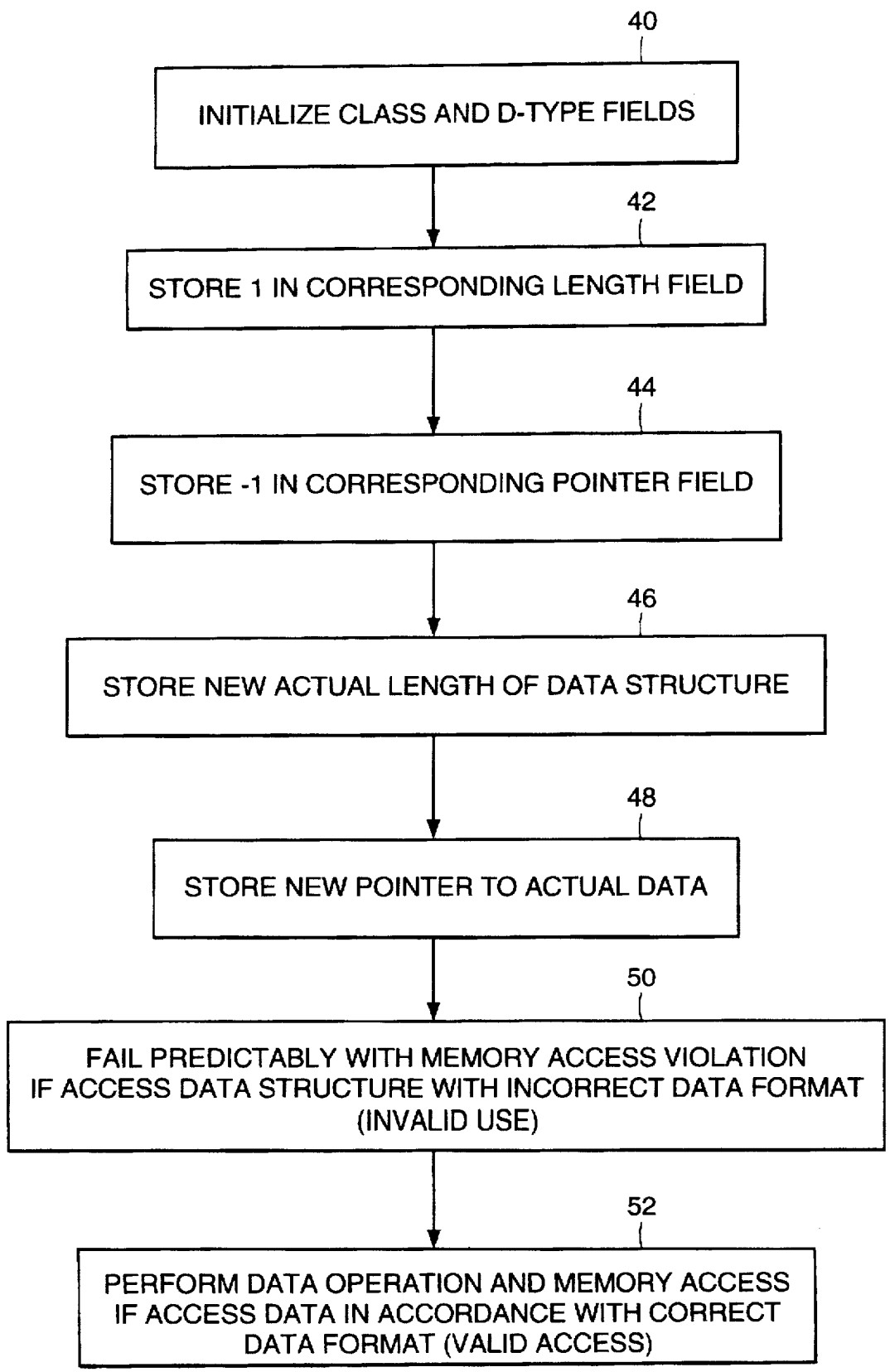
FIG. 3 is a flow chart outlining the steps for initializing a data structure of FIG. 2A and subsequent actions that occur as a result of using the data structure.

Referring now to FIG. 3, a method for initializing a data structure of FIG. 2A enabling proper detection and handling of a subsequent invalid use of the data structure is shown. Using the data structure format of FIG. 2A, steps 40–48 initialize the data structure. Subsequent steps 50 and 52 are performed later during execution of a program using the data structure initialized in accordance with steps 40–48.

The CLASS and D-TYPE fields are initialized in accordance with the argument being passed, as in step 40. As in step 42, the integer value of 1 is stored in the MBO field 30c which overlays LENGTH field 22c. As in step 44, a minus 1 integer quantity is stored in the MBMO field 30d which overlays POINTER field 22d. The actual length of the data item or routine argument associated with the data structure is stored in LENGTH field 30e, as in step 46. A pointer to the data item or routine argument is stored in field 30f as in step 48.

The second program 21 (FIG. 1) written in accordance with the second calling standard expects an argument descriptor of the format in FIG. 2B, and interprets a data item in accordance with the format of FIG. 2B. If the second program 21 is called by the first program 20 written in accordance with the first calling standard, the second program is passed, as routine arguments, an argument descriptor of the format of FIG. 2A and a corresponding data item. At some point in execution, the second program usually attempts to access the corresponding data item stored in memory using information in the argument descriptor contained at bytes 4–7 inclusively for the address of the first byte of data in memory, and for length of the data item, as indicated in bytes 0 and 1 of the argument descriptor data structure. A computer program can use both the address and length of the data, for example, when attempting to access the last byte of the data item. The foregoing attempted access of the corresponding data item by the second program is an invalid use of the argument descriptor to interpret the corresponding data item. This invalid use of the value of 1 (MBO) stored in the LENGTH field 22c and minus 1 (MBMO) stored as the POINTER field 22d as a memory address guarantees that the second program will fail when attempting to access the corresponding data item. Specifically, the second program 21 will fail when attempting to perform a memory access using a pointer or address of an argument descriptor comprising data stored in accordance with the first calling standard, as specified in FIG. 2A, when the second program interprets the data stored in accordance with a second calling standard using a data format as shown in FIG. 2B.

Thus, the second program which attempts an invalid use of a data structure, as in step 50 will fail predictably with a memory access violation if an attempt is made by the second program to access data using an argument descriptor written or initialized in accordance with the first calling standard using the data format of FIG. 2A.

Alternatively, if the second program performs a data operation in memory access which is a valid access, i.e., it interprets data in accordance with the format of FIG. 2B, the data operation is successful and the memory access is valid as shown in step 52.

It should be noted that detecting an attempted memory access using an invalid memory address is generally performed by memory management hardware and software causing the computer program attempting the memory access to fail.

As mentioned, the OpenVMS® Operating System of Digital Equipment Corporation ® defines the second calling standard which includes the data structure format for an argument descriptor shown in FIG. 2B. As the virtual addressing scheme expands to 64-bit addresses, a new calling standard is defined. Here the new calling standard is the first calling standard including a data structure as show in FIG. 2A. As part of the first calling standard, an argument descriptor format that includes 64-bit addresses is needed. The argument descriptor included in the first calling standard has a format as shown in FIG. 2A.

However, additional considerations and design goals are relevant in arriving at the final layout of the argument descriptor of FIG. 2A. It is desirable to have the second program which does not check for or use this first format to behave and fail in a predictable fashion when presented with an argument descriptor written in conformance with the first calling standard.

The foregoing embodiment of the argument descriptor 30 (FIG. 2A) guarantees that many different invalid data accesses to a corresponding data item will fail predictably. That is, using the argument descriptor 30, which includes both the MBO and MBMO fields overlaying, respectively, the LENGTH field 22c and POINTER field 22d, ensures that a variety of invalid uses of the argument descriptor 30 by the second program will fail predictably rather than only fail predictably for a more limited number of invalid uses.

An alternate embodiment of the argument descriptor 30 is simply to expand the CLASS and D-TYPE fields 22a and 22b, respectively, to include or add additional types for the 64-bit addresses in the argument descriptor 30. However, this will not necessarily achieve the desired behavior that the second program will fail or behave in a predictable fashion when presented with a data structure (argument descriptor) written in conformance with the first calling standard. The reason is that some programs written in accordance with the second calling standard do not examine the CLASS and D-TYPE fields prior to accessing the data. These programs should fail predictably when attempting an invalid use of a data structure without modification. Thus, this alternate embodiment enables predictable behavior for a limited number of programs.

Another alternate general approach is to define the first argument descriptor format, as in FIG. 2A, in which an invalid use of the data structure forces predictable behavior, and when a valid use occurs, execution of a computer program continues. There are different alternate embodiments of the argument descriptor 30 which use this general approach of redefining the argument descriptor format rather than add new types. Previously mentioned in conjunction with FIG. 2A is an embodiment of the argument descriptor 30 which requires special data to be stored in bit positions corresponding to both the LENGTH 22c and POINTER 22d fields, i.e. MBMO field 30d with −1 and MBO field 30c with 1. Alternate embodiments of the argument descriptor 30 which do not require special data to be stored in both of the MBMO and MBO fields will now be described. However, these embodiments may not afford the same level of generally predictable failure as the embodiment of FIG. 2A.

As previously discussed, an example of an invalid use occurs when the second program interprets the MBMO field 30d of argument descriptor 30 as a pointer using the 32-bit address calling standard when the data structure 30 contains data stored in accordance with the first 64-bit address calling standard. One technique to cause the foregoing behavior includes defining a new format of the argument descriptor 30 placing a special address value into the bit position corresponding to POINTER field 22d to enable an application to distinguish between the 32-bit and 64-bit argument descriptors.

One embodiment of the argument descriptor 30 includes storing an integer value of 0 as the MBMO field 30d corresponding to the bit positions of the address or POINTER field 22d at bytes 4–7. This presents a problem in that an address of 0 is equated to a null pointer in many computing environments rather than an invalid address. An address of 0 may not always be useful as a value to distinguish between the 32-bit and the 64-bit descriptor. The second program may simply conclude that it has a null or uninitialized pointer. Additionally, an address of 0 may actually be a valid address in some computing environments. This particular embodiment of the argument descriptor 30 will also predictably fail in a limited number of computing environments.

Yet another alternate embodiment of the argument descriptor 30 includes a value which is always guaranteed to be an inaccessible or invalid memory address in the bit positions corresponding to POINTER field 22d. Specifically, bytes 4–7 of the data structure 30 contain information such that when bytes 4–7 are invalidly interpreted and used in accordance with the incorrect second calling standard format, a memory access violation occurs. For example, as previously mentioned, in the OpenVMS ® Operating System by Digital Equipment Corporation ®, the integer constant minus 1 is guaranteed to represent an inaccessible address. An attempt to access memory with a pointer or address of minus 1 (−1) will cause the program to fail with a memory access violation error code and error message. This is a good alternative value, rather than 0, to place in bit positions of the argument descriptor 30 corresponding to POINTER field 22d.

However, one drawback to either of the foregoing embodiments, i.e., placing 0 or −1 in bit positions corresponding to POINTER field 22d, is that the second program may not attempt to access the first byte of memory using the inaccessible address. The first memory access in a routine of the second program can include accessing the last byte of data of an argument. The address of the last byte of data is typically an address calculation that includes adding the POINTER or address 22d with the length 22c to obtain the address of the last byte of data, and then subtracting one (1) from the result, e.g. pointer + length −1. To guarantee predictable behavior or failure with an invalid address in these applications as well, the LENGTH field is also considered as was mentioned above. An alternate embodiment, besides that previously described in conjunction with FIG. 2A, which consider the LENGTH field 22c in combination with the POINTER field 22d will now be described.

In choosing a value included in the argument descriptor 30 corresponding to the LENGTH field 22c, another characteristic regarding the type of data access that can be performed by the second program is considered. Prior to performing a memory access using the POINTER field, some routines included in the second program check the LENGTH field to see if the value is equal to 0. If it is determined that the value is 0, the routine typically exits or ignores the argument descriptor and corresponding data item, since it is assumed that the argument descriptor is nonexistent or 0 length. The second program may not ever use the inaccessible address if the LENGTH field is also 0. This is not a predictable failure in that the second program assumes, by the zero value stored in the LENGTH field, that the argument has a 0 length, and execution proceeds as if the data structure 30 passed is valid for use by the second program. Thus, when choosing the value to be stored within argument descriptor 30 corresponding to the LENGTH field 22c, the value should generally be non-zero causing a called routine, which is included in the second program and tries to use the invalid address, to continue executing and cause an access violation, rather than causing the called routine to exit or ignore the argument descriptor and its corresponding data item.

In light of the foregoing considerations, an embodiment of the argument descriptor 30 as in FIG. 2A can include a positive length value, such as 1 (MBO field), corresponding to the bit positions of the LENGTH field 22c. Thus, a routine included in the second program which checks for a non-zero length and exits if the length is 0 will be forced to look at the address and assume a non-null argument. Additionally, since the second program may attempt to access the last byte of data, it is desirable that the effective address calculation resulting from LENGTH plus POINTER minus 1 produces an invalid address. Therefore, as previously discussed in conjunction with the particular embodiment of FIG. 2A, a length of 1 was chosen to be used with the invalid address of −1 in the MBMO field 30d.

In light of the foregoing discussions and embodiments of the argument descriptor 30, the data format included in a first 64-bit calling standard for the OpenVMS® Operating System intended for the Alpha® architecture by Digital Equipment Corporations® is the argument descriptor of FIG. 2A.

In this particular computing environment, the embodiment of the argument descriptor 30 in FIG. 2A which considers the bit positions in 30c and 30d corresponding to both the LENGTH 22c and POINTER 22d fields of FIG. 2B is included in the first 64-bit calling standard. An additional benefit of this particular embodiment is that no new CLASS or D-TYPE field is added. An existing CLASS and D-TYPE field currently used in the second calling standard can be used in both the first and second calling standards.

The values stored in fields MBO 30c and MBMO 30d, which respectively correspond to the LENGTH and POINTER fields 22c and 22d, are guaranteed to generally cause a memory access violation when the data structure is invalidly used by the second computer program. Thus, the second program which is written in accordance with the second calling standard using data structures as in FIG. 2B is guaranteed to behave in a predictable fashion when the second program is passed an argument which is a data structure written in accordance with the first calling standard, as shown in FIG. 2A.

Using the data structure of FIG. 2A also obviates the need for source changes for existing code or existing data structures to achieve this predictable behavior. A failure such as that resulting from a memory access violation is typically handled by existing code using an error handler routine.

The advantages of using a format as depicted in FIG. 2A is that it produces a predictable failure for an invalid use of a data structure written in accordance with the first calling standard. A program that continues executing using an invalid argument descriptor or data structure can cause loss of data integrity. For example, consider a computing environment that includes the 64-bit virtual addressing scheme of the OpenVMS® Operating System executable in an Alpha® computer system. If the MBMO field, which corresponds to POINTER field 22d (bytes 4–7), contains information as depicted in FIG. 2A, interpreting information at bytes 4–7 of the argument descriptor in accordance with the second calling standard produces an invalid address preventing change or corruption of memory and/or file contents. Additionally, this data corruption may be detected earlier in program execution making the determination of the actual cause of this data corruption much easier.

An advantage of using the updated argument descriptor format of FIG. 2A is that a library routine, for example, which is called from an application program may expect and handle both data formats in accordance with the first calling standard and the second calling standard.

Figure 4:
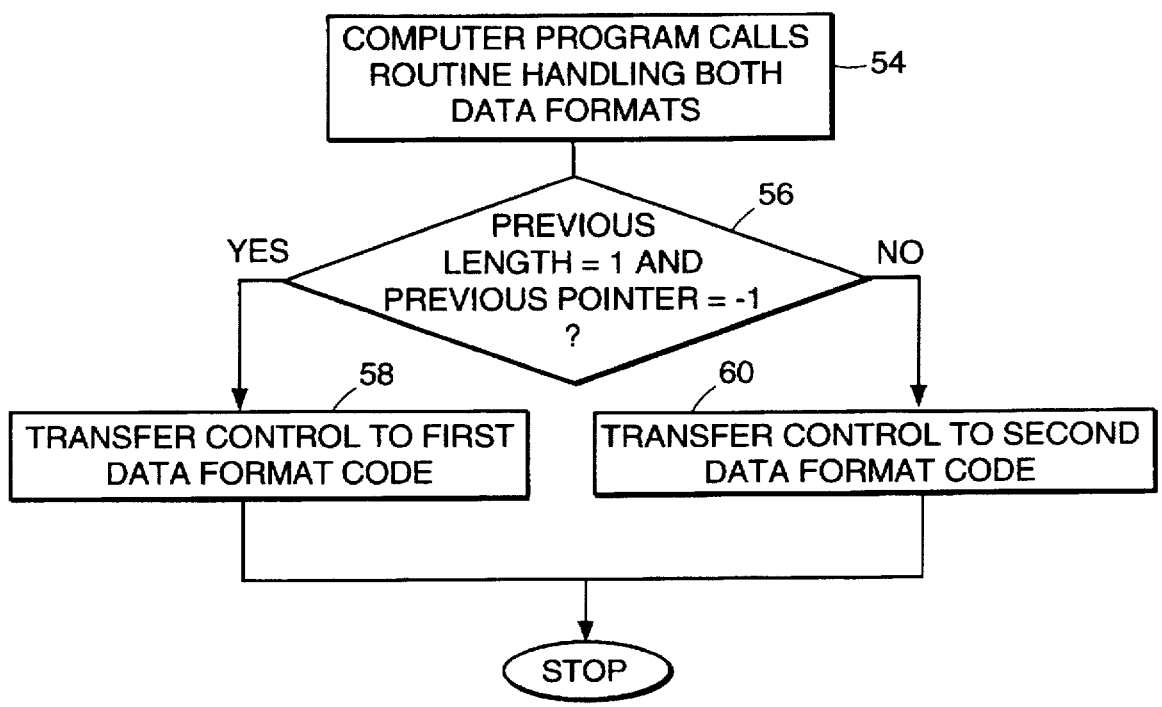
FIG. 4 is a flow chart outlining steps for distinguishing between a first data structure in accordance with a 64-bit virtual addressing scheme calling standard and second data structure in accordance with a 32-bit virtual addressing scheme calling standard.

Referring now to FIG. 4, method steps executed by a routine expecting both data formats are shown. As in step 54, a computer program calls a routine that handles both data formats from the first and second calling standards having, respectively a 64-bit and a 32-bit virtual addressing scheme. The called routine makes a determination, as in step 56, as to whether the LENGTH field of the second calling standard (referred to as "previous length") is 1 and the POINTER field of the second calling standard (referred to as "previous pointer") is minus 1. In particular, the called routine tests bytes 0 and 1, previous LENGTH field 22c, to determine if the bytes represent an integer value of one (1). The called routine also determines whether bytes 4–7, the previous pointer 22d, of the data structure represent the value of minus one (−1). If a determination is made that the previous length is 1 and the previous pointer field is minus 1, as in step 58, control is transferred to code that interprets the data structure in accordance with the first format or the first calling standard as in FIG. 2A. If a determination is made, as in step 60, that the previous length field is not 1, or that the previous pointer field is not −1, control is transferred to code that interprets the data structure in accordance with the second calling standard as in FIG. 2B.

Figure 5A:
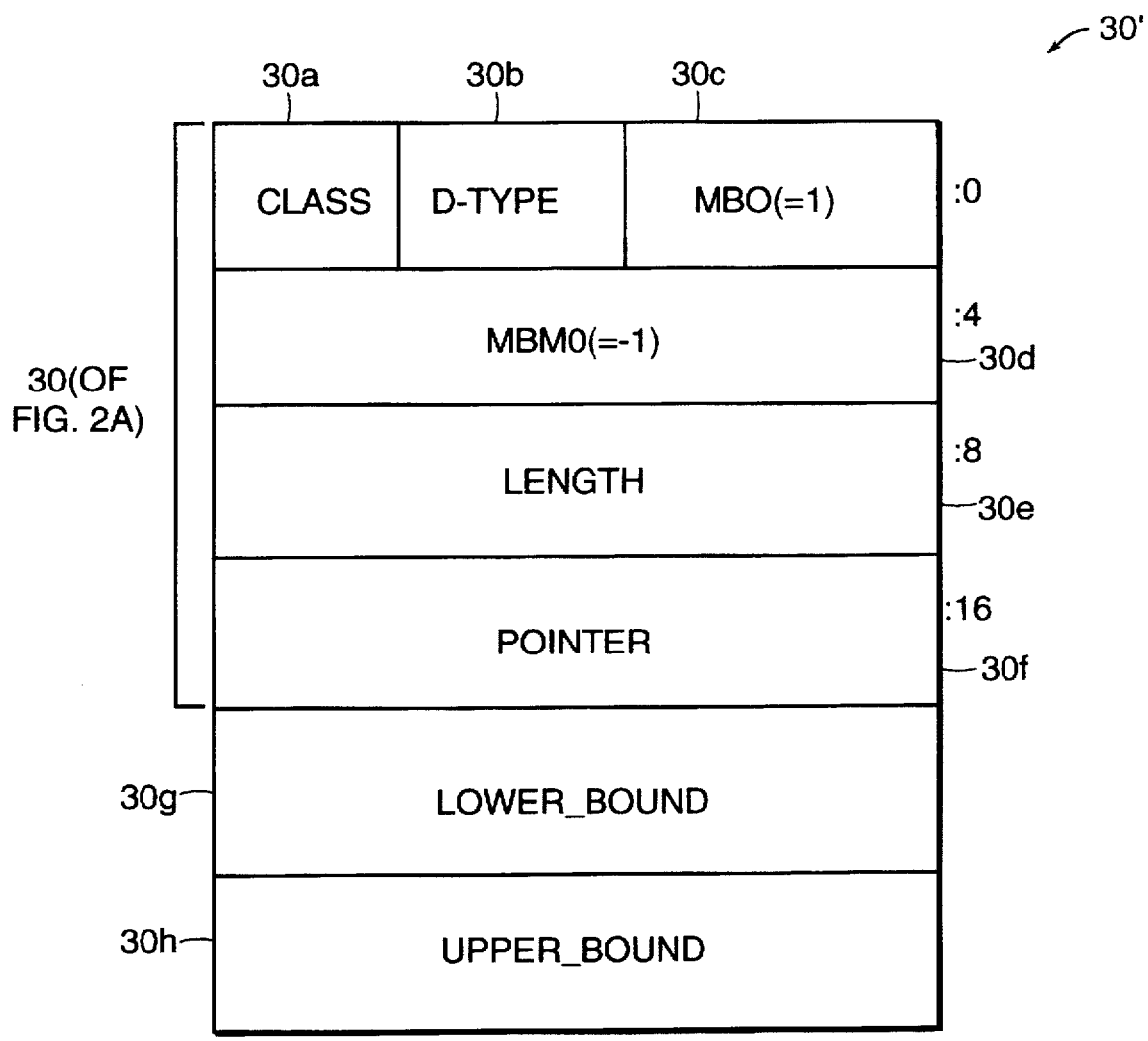
FIG. 5A is a block diagram of a string with a bounds descriptor in the first calling standard with 64-bit virtual address.

Referring now to FIG. 5A, a data structure in the 64-bit address or first calling standard is shown. The data structure 30' depicted in FIG. 5A includes a CLASS field 30a, a D-TYPE field 30b, an MBO field 30c and MBMO field 30d, a LENGTH field 30e, and a POINTER field 30f. These fields were previously discussed in conjunction with the argument descriptor 30 of FIG. 2A. It should be noted that additional considerations, such as data alignment requirements, may cause the starting offsets and sizes of various fields to be modified and different in the first calling standard of a particular computing environment. The data structure 30' is an argument descriptor generally used within the first calling standard, such as a version of the OpenVMS ® Operating System with 64-bit virtual addressing.

The format depicted in FIG. 5A, which is a format header for the string with bounds descriptor, is a specific embodiment of the format depicted in FIG. 2A. Specifically, FIG. 5A includes the fields depicted in FIG. 2A. Appended to these fields are LOWER BOUND field 30g and UPPER BOUND field 30h corresponding, respectively, to the LOWER BOUND field 22e and UPPER BOUND field 22f of FIG. 5B. Similarly, any existing format written in accordance with the second calling standard, such as the format depicted in FIG. 5B has a corresponding 64-bit format included in the first calling standard. Each corresponding 64-bit format can be determined by appending other fields to the format depicted in FIG. 2A. Hence, the format of FIG. 2A is a uniform argument descriptor which is used in conjunction with describing all types of routine parameters or arguments.

A data structure initialized in accordance with the second calling standard depicted in FIG. 2B also may have subsequent data following the POINTER field 22d. Subsequent data may be included, for example, if the second calling standard includes other predefined formats corresponding to other argument descriptors. Recall that the format of FIG. 2B was previously referred to as a uniform argument descriptor or prototype argument descriptor that may be included as a generic header for other argument descriptors of a calling standard.

Figure 5B:
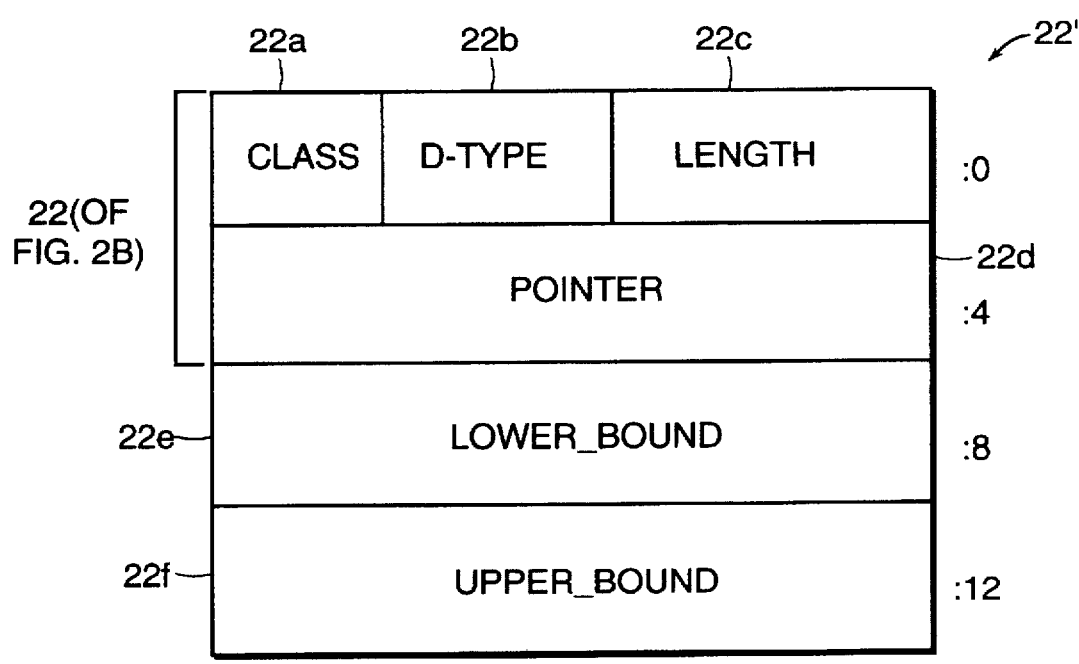
FIG. 5B is a block diagram of a string with a bounds descriptor in the second conventional calling standard with 32-bit virtual address.

An example format of another argument descriptor that includes the format of FIG. 2B and other subsequent fields is shown in FIG. 5B. FIG. 5B depicts an argument descriptor 22' associated with a routine parameter which is a string with a bounds descriptor. An example of such a routine parameter is a string, such as an alphanumeric string, which has user specified length or bounds and is viewed as a one-dimensional array. The argument descriptor 22' is generally used within the second calling standard such as a version of the OpenVMS ® Operating System including a 32-bit virtual addressing scheme. The CLASS field 22a and D-TYPE field 22b are initialized in accordance with predefined values corresponding to the string with bounds descriptor argument type. The LENGTH field 22c is the length of the string parameter data in bytes. The POINTER field 22d contains the address of the first byte of data comprising the string. The LOWER BOUND 22e represents the lower bound of the array, typically an integer quantity. Similarly, the UPPER BOUND field 22f contains an integer quantity representing the upper bound of the array. The effective address E of the string element A (I) is represented by the equation:

$$E = \text{pointer} + [I - \text{lower bound}]$$

Referring back to FIGS. 2A and 2B, the data structure 30 is included in the 64-bit or first calling standard and is a counterpart for the 32-bit fixed length descriptor 22 included in the second calling standard. The argument descriptor 22 (FIG. 2B) or 30 (FIG. 2A) can also be used as a fixed length descriptor to describe scalar data and strings, such as alphanumeric, packed, and bit strings, having a fixed length. For example, using descriptor 22, to describe a packed decimal string in which each digit is encoded in four (4) bits of data, the CLASS field 22a and D-TYPE field 22b are initialized in accordance with predefined values corresponding to the fixed length descriptor type, such as the packed decimal string. The LENGTH field 22c is the length of the data item associated with the argument descriptor 22. The POINTER field 22d contains a pointer, such as an address, to the first byte of the data comprising the data item. In the particular case in which the data type represented by the CLASS and D-TYPE fields 22a and 22b is a packed decimal string, the LENGTH field 22c contains the number of 4-bit digits in the string. A computer program in the second environment would use the value in the LENGTH field 22c to determine the number of digits represented by the data item.

The foregoing technique affords a flexible and efficient way of detecting and handling an invalid use of the data structure. In particular, the foregoing technique may be used to detect an invalid use of a data structure written in accordance with one calling standard when that data structure is invalidly used by existing code which interprets the data structure in accordance with another, different calling standard.

The foregoing technique causes a computer program which invalidly uses a data structure to fail in a predictable fashion. The invalid use is detected early during program execution which aids in debugging software and avoids problems such as loss of data integrity. Additionally, all of this is accomplished without adversely affecting or modifying code written in accordance with the first calling standard.

Having described preferred embodiments of the invention, it will now become apparent to those of skill in the art that other embodiments incorporating its concepts may be provided. It is felt, therefore, that this invention should not be limited to the disclosed embodiments, but rather should be limited only by the spirit and scope of the appended claims.

What is claimed is:

1. A method executed in a computer system for detecting and handling an invalid use of a data structure comprising the steps of:

providing a data structure associated with a first computing environment, said data structure including a field having a value stored therein identifying an inaccessible address in a second computing environment; and detecting an invalid use of said data structure in said second computing environment by a computer program attempting to access memory using said inaccessible address indicated by said value contained in said first field.

2. The method of claim 1 whereupon detecting an invalid use, said computer program fails predictably in accordance with a predetermined behavior.

3. The method of claim 2 wherein said data structure further comprises:

a second field having a value indicating a length related to the length of a data item associated with a data structure in the second computing environment.

4. The method of claim 3 wherein said step of detecting further comprises the step of determining a second inaccessible address by using said values in said first and said second fields.

5. The method of claim 4 wherein said computer program is a first computer program and said data structure further includes a third field indicating an address of a valid memory location in said first computing environment, and wherein the method further comprises the step of:

detecting a valid use in said first computing environment by a second computer program successfully performing a data operation by using said third field as an indicator of an address of a memory location in said first computing environment.

6. The method of claim 5 wherein said data structure further comprises:

a fourth field indicating a data type of said data item.

7. The method of claim 6 wherein said first computing environment uses 64-bit virtual memory addresses and said second computing environment uses 32-bit virtual memory, said third field indicating one of said 64-bit virtual memory addresses.

8. The method of claim 7 wherein said inaccessible address is a minus one integer value.

9. The method of claim 8 wherein said second computing environment uses 32-bit virtual memory addresses and said value in said first field indicates an invalid 32-bit virtual memory address.

10. The method of claim 7 wherein said inaccessible address is a zero integer value.

11. The method of claim 6 wherein said second computer program executes in said first computing environment and is written in accordance with a first calling standard associated with said first computing environment, and the method further comprising the steps of:

calling, by said second computer program, a routine included in said first computer program comprising executable code which uses the data structure in accordance with a second calling standard associated with said second computing environment;

performing, by said routine, a memory address calculation to obtain a resulting address by using values in said first and second fields of said data structure to provide an address value and subtracting an integer value of one from said address value, said memory address calculation being performed to access the last memory addressable unit of said data item, said address value being another inaccessible address in said second computing environment;

attempting, by said routine, a memory access using said address value and wherein said detecting step causes said routine to fail predictably.

12. The method of claim 5 wherein said method further includes the steps of:

one of said first or said second computer programs calling a routine that uses data structures written for use in both said first and said second computing environments; and said routine determining that said data structure is for use in said first computing environment by determining that said values in said first and second fields indicate, respectively, a first predetermined value and a second predetermined value, otherwise said routine determines that said data structure is for use in said second computing environment.

13. The method of claim 5 wherein said invalid use in said second computing environment includes the step of said first computer program using said values in said first and said second fields to form said inaccessible address.

14. The method of claim 5 wherein a first calling standard is associated with said first computing environment and a second calling standard is associated with said second computing environment and said invalid use of said data structure in said second computing environment includes using said data structure in accordance with said second calling standard when said data structure contains values meant for use in accordance with said first calling standard in said first computing environment.

15. The method of claim 14 wherein said second computing environment is a predecessor computing environment of said first computing environment, said first computing environment including a subsequent version of a calling standard used in said second computing environment, said first and said second computing environments including the same computer architecture instruction set.

16. The method of claim 1 wherein said data structure has a corresponding data item passed as a parameter in a routine call.

17. The method of claim 1 wherein said computer program using said data structure includes an error handler which captures and properly handles said invalid use by executing appropriate instructions to terminate execution of said computer program, said execution terminating with a predetermined error status.

18. A memory including a data structure having a format used in a first computing environment comprising:

first field used to detect an invalid use of said data structure in a second computing environment, said first field representing a length of a data item associated with said data structure were said data structure used in said second computing environment;

a second field containing a value indicating an inaccessible memory address in said second computing environment; and a third field containing a valid memory address in said first computing environment.

19. The memory of claim 18 wherein said data structure includes one or more type information fields indicating the type of a data item associated with said data structure, said type fields including:

a class code field indicating one of a set of predefined classes of said data item, said set of predefined classes identifying the format and interpretation of other fields in the data structure; and a data type code field indicating one of a set of predefined data types of said data item, said set of predefined data types and said set of predefined classes representing type values used in said first and second computing environments.

20. The memory of claim 19 wherein said class code field represents one of a string or an array, and said data type code represents one of an integer, a floating point number, a memory address, an ASCII character, or an unaligned data item.

21. The memory of claim 18 wherein said first field indicates a dummy length that is a positive integer and which, when the integer one is subtracted from the sum of said inaccessible address and said positive integer, produces another inaccessible address in said second computing environment.

22. The memory of claim 18 wherein said data structure further comprises:

a fourth field containing a length representing the size of a data item associated with said data structure in said first computing environment.

23. The memory of claim 18 wherein a computer program uses said values in said first and said second fields to perform an address calculation producing another inaccessible address in said second computing environment.

24. The memory of claim 22 wherein said first, said second, said third, and said fourth fields comprise a generic argument descriptor used to describe arguments passed to and from a routine in accordance with a calling standard in said first computing environment.

25. The memory of claim 24 wherein a data item associated with said data structure represents argument data being passed as a routine parameter, and wherein said data structure comprises additional information further describing said data item.

26. An apparatus for detecting an invalid use of a data structure, the apparatus comprising:

a first template used with one or more values contained in said data structure in a first computing environment, said first template comprising a first field containing an invalid memory address in a second computing environment, said first field overlaying a second address field that comprises a second template used with one or more values contained in said data structure in said second computing environment; and memory access violation means for detecting an invalid use of said data structure in said second computing environment when said data structure contains values stored in accordance with said first template for use in said first computing environment and said values are used in accordance with said second template, said invalid use occurring in said second computing environment when attempting a memory access using said invalid address.

27. The apparatus of claim 26 wherein said first template further includes a second field indicating a dummy length value overlaying a data item length field from said second template indicating the length of a data item associated with said data structure, and wherein said memory access violation means uses said dummy length value to attempt said memory access.

28. The apparatus of claim 27 wherein subtracting one from a first result of adding said dummy length value to said invalid memory address produces a second result which is another invalid memory address in said second computing environment.

29. A memory comprising:

a first data structure, associated with a first computing environment, comprising:

a first field having a value stored therein identifying an inaccessible address in said second computing environment;

a second field having a value stored therein identifying a dummy length related to the length of a data item associated with a second data structure in a second computing environment;

a third field having a value stored therein identifying a valid address in said first computing environment; and a fourth field having a value stored therein identifying a length of a first data item associated with said first data structure in said first computing environment;

said second data structure, associated with said second computing environment, comprising:

a first field having a value stored therein identifying a length of a second data item associated with said second data structure with said second field of said first data structure occupying the same bit positions as said first field of said second data structure; and a second field having a value stored therein identifying a memory address of said second data item with said first field of said first data structure occupying the same bit positions as said second field of said second data structure;

a first computer program associated with said first computing environment that performs a memory access using said values stored in said third and said fourth fields of said first data structure; and a second computer program associated with said second computing environment that performs a memory access using said values stored in said first and second fields of said second data structure and whereupon an invalid use of said first data structure by said second computer program executing in said second computing environment is detected when said second computer program attempts to access memory using values stored in said first field and said second field of said first data structure.

30. The memory of claim 29 wherein each of said first and said second data structures further include:

a type field indicating a data type of said data item associated with said each data structure.

* * * * *